US011250458B1

(12) United States Patent
Moser, III

(10) Patent No.: US 11,250,458 B1
(45) Date of Patent: Feb. 15, 2022

(54) VOICE-BASED DIGITAL PROMOTION SYSTEM AND RELATED METHODS

(71) Applicant: INMAR CLEARING, INC., Winston-Salem, NC (US)

(72) Inventor: Wade Hauser Moser, III, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 196 days.

(21) Appl. No.: 15/897,471

(22) Filed: Feb. 15, 2018

(51) Int. Cl.
    *G06Q 30/02*     (2012.01)
    *G06Q 20/36*     (2012.01)

(52) U.S. Cl.
    CPC ......... *G06Q 30/0226* (2013.01); *G06Q 20/36* (2013.01); *G06Q 30/0224* (2013.01)

(58) Field of Classification Search
    None
    See application file for complete search history.

(56) References Cited

U.S. PATENT DOCUMENTS

| | | | | |
|---|---|---|---|---|
| 11,030,535 B1 * | 6/2021 | Arora | ................. | G06Q 30/0282 |
| 2002/0174011 A1 * | 11/2002 | Sanchez | ............... | G06Q 20/387 |
| | | | | 705/14.25 |
| 2004/0006478 A1 * | 1/2004 | Alpdemir | ............... | G06Q 30/02 |
| | | | | 704/275 |
| 2012/0245944 A1 * | 9/2012 | Gruber | ................... | G10L 15/22 |
| | | | | 704/270.1 |
| 2014/0330645 A1 * | 11/2014 | Craft | ................. | G06Q 30/0255 |
| | | | | 705/14.53 |
| 2015/0073907 A1 * | 3/2015 | Purves | ................... | G06Q 20/32 |
| | | | | 705/14.58 |
| 2016/0162936 A1 * | 6/2016 | Khalil | ................ | G06Q 30/0261 |
| | | | | 705/14.52 |
| 2017/0068982 A1 * | 3/2017 | Vangala | ................. | G06Q 50/12 |
| 2018/0034755 A1 * | 2/2018 | Saoji | ................. | G06Q 30/0261 |

FOREIGN PATENT DOCUMENTS

KR      20110031784 A * 3/2011

OTHER PUBLICATIONS

Cabebe, Jaymar, "Sherpa Beta Virtual Assistant (Android) review", CNET.com, Apr. 17, 2013 https://webcache.googleusercontent.com/search?q=cache:ZMHmXlcCpCIJ:https://www.cnet.com/reviews/sherpa-beta-virtual-assistant-android-preview/+&cd=12&hl=en&ct=clnk&gl=us (Year: 2013).*

(Continued)

*Primary Examiner* — Kambiz Abdi
*Assistant Examiner* — Scott Snider
(74) *Attorney, Agent, or Firm* — Allen, Dyer, Doppelt + Gilchrist, P.A.

(57) ABSTRACT

A voice-based digital promotion system may include an intelligent personal assistant. The voice-based digital promotion system may also include a remote sever configured to receive a request for a digital promotion from a given user via the intelligent personal assistant and determine a corresponding retailer loyalty program associated with the given user. The remote server may also be configured to determine at least one digital promotion for the given user based upon the retailer loyalty program, and communicate the at least one digital promotion to the given user via the intelligent personal assistant.

15 Claims, 3 Drawing Sheets

(56) References Cited

OTHER PUBLICATIONS

Kaplan, David, "Retale Attempts to Bridge Voice Assistant Grocer Gap Between Google and Amazon", geomarketing from yext, Sep. 18, 2017, https://web.archive.org/web/20171023072350/http://www.geomarketing.com/retale-attempts-to-bridge-voice-assistant-gap-between-google-and-amazon (Year: 2017).*

Chen, Brian X., "Siri, Alexa and Other Virtual Assistants Put to the Test", NYTimes.com, Jan. 27, 2016, https://web.archive.org/web/20171231181829/https://www.nytimes.com/2016/01/28/technology/personaltech/siri-alexa-and-other-virtual-assistants-put-to-the-test.html (Year: 2016).*

* cited by examiner

VOICE-BASED DIGITAL PROMOTION SYSTEM AND RELATED METHODS

TECHNICAL FIELD

The present invention relates to the field of electronics, and, more particularly, to the display and processing of digital promotions, and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A voice-based digital promotion system may include an intelligent personal assistant and a remote sever. The remote server may be configured to receive a request for a digital promotion from a given user via the intelligent personal assistant and determine a corresponding retailer loyalty program associated with the given user. The remote server may also be configured to determine at least one digital promotion for the given user based upon the retailer loyalty program and communicate the at least one digital promotion to the given user via the intelligent personal assistant.

The at least one digital promotion may include a plurality thereof. The remote server may be configured to receive a selected digital promotion from the plurality thereof from the given user via the intelligent personal assistant, for example.

The intelligent personal assistant may include an audio input transducer and a controller cooperating therewith to audibly receive the selected digital promotion from the given user. The remote server may be configured to store the selected digital promotion in a digital wallet associated with the given user, for example. The intelligent personal assistant may include an audio output transducer and a controller cooperating therewith to audibly communicate the at least one digital promotion to the given user, for example.

The remote server may be configured to determine the corresponding retailer loyalty program associated with the given user based upon a unique user identifier. The unique user identifier may include one of a telephone number and an email address, for example.

The retailer loyalty program may include historical purchase data associated with the given user. The remote server may be configured to determine the at least one digital promotion for the given user based upon the historical purchase data, for example.

A method aspect is directed to a method of communicating a digital promotion. The method may include using a remote sever to receive a request for a digital promotion from a given user via an intelligent personal assistant and determine a corresponding retailer loyalty program associated with the given user. The method may also include using the remote server to determine at least one digital promotion for the given user based upon the retailer loyalty program and communicate the at least one digital promotion to the given user via the intelligent personal assistant.

A computer-readable medium aspect is directed to a non-transitory computer-readable medium for a voice-based digital promotion system that includes an intelligent personal assistant and a remote server. The non-transitory computer-readable medium includes computer-executable instructions that when executed by a processor of the remote server cause the processor to perform operations that may include receiving a request for a digital promotion from a given user via the intelligent personal assistant and determining a corresponding retailer loyalty program associated with the given user. The operations may also include determining at least one digital promotion for the given user based upon the retailer loyalty program and communicating the at least one digital promotion to the given user via the intelligent personal assistant.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
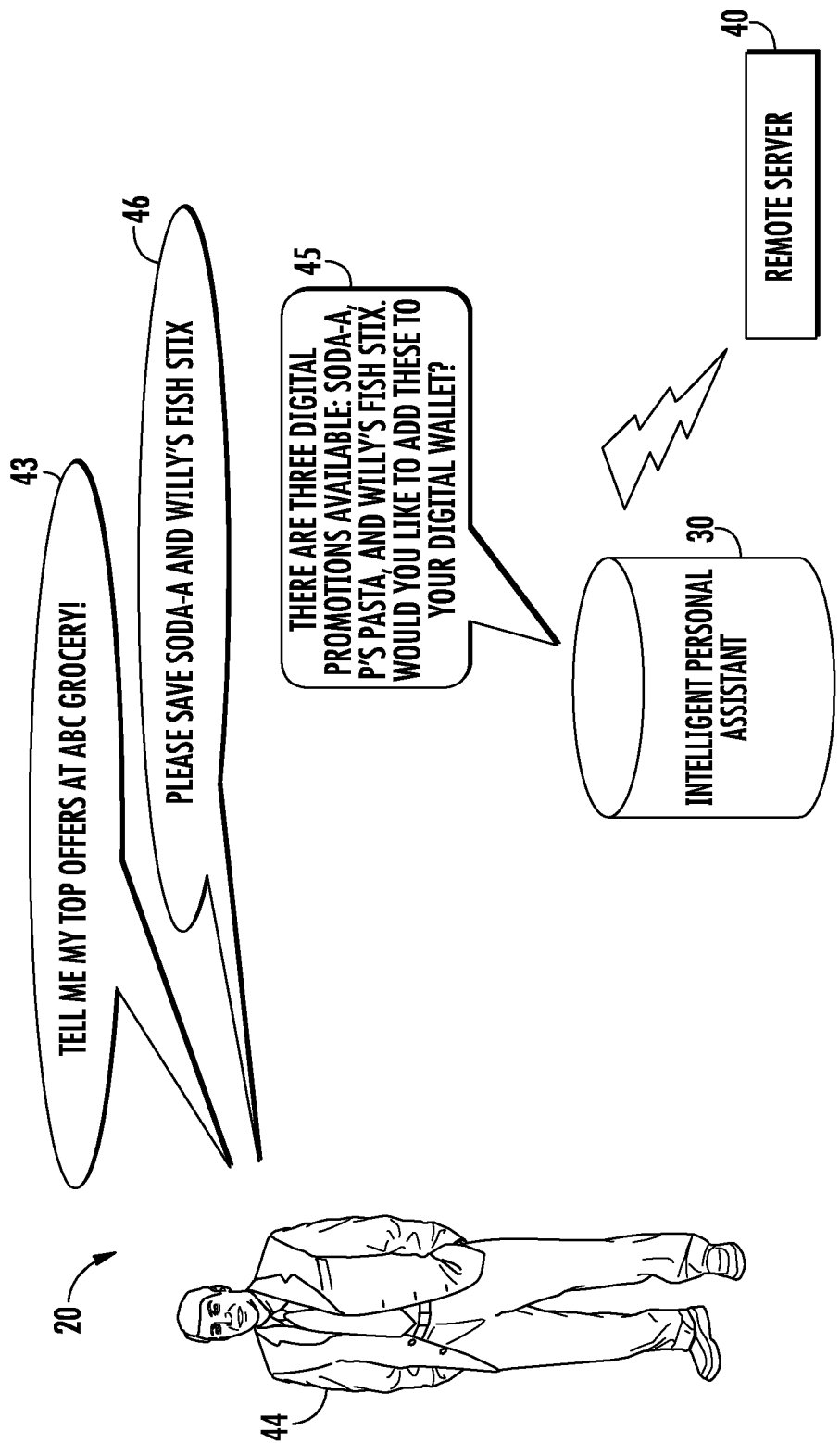
FIG. 1 is a schematic diagram of a voice-based digital promotion system in accordance with an embodiment.
Figure 2:
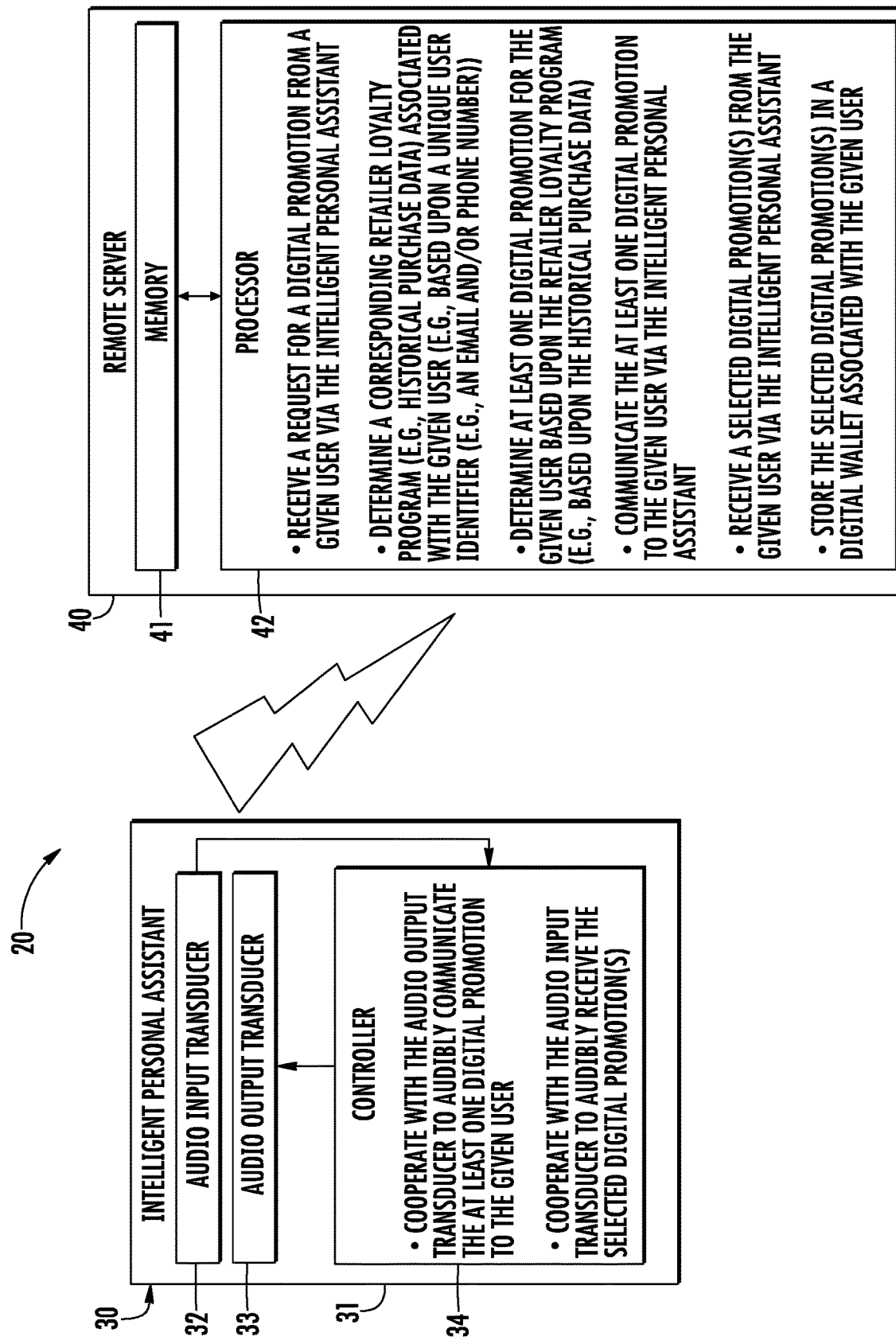
FIG. 2 is a more detailed schematic diagram of the voice-based digital promotion system of FIG. 1

Referring initially to FIGS. 1 and 2, a voice-based digital promotion system 20 includes an intelligent personal assistant 30. As will be appreciated by those skilled in the art, an intelligent personal assistant 30, which may also be referred to as a voice-activated artificial intelligent (AI) interface may perform tasks or services for a given user based upon audible, verbal, or spoken instructions. Exemplary intelligent personal assistants may be embodied in a mobile wireless communications device or smartphone or other device, or may be a standalone device and include Apple's Siri™, Google Assistant, Amazon Alexa™, and Microsoft Cortana™.

The intelligent personal assistant 30 illustratively includes a housing 31 and an audio input transducer 32 (e.g., microphone) carried by the housing. The intelligent personal assistant 30 also includes an audio output transducer 33 (e.g., speaker) carried by the housing 31. A controller 34 cooperates with the audio input and output transducers 32, 33.

The voice-based digital promotion system 20 also includes a remote server 40 in communication with the intelligent personal assistant 20. More particularly, the remote server 40 may be a cloud-based remote server and may communicate with the intelligent personal assistant 30 via the internet and/or one or more wired or wireless networks. The remote server 40 includes a memory 41 and a processor 42 coupled to the memory. While specific functions of the remote server 40 are described herein, it should be appreciated that the functions are performed through cooperation of the memory 41 and processor 42.

Figure 3:
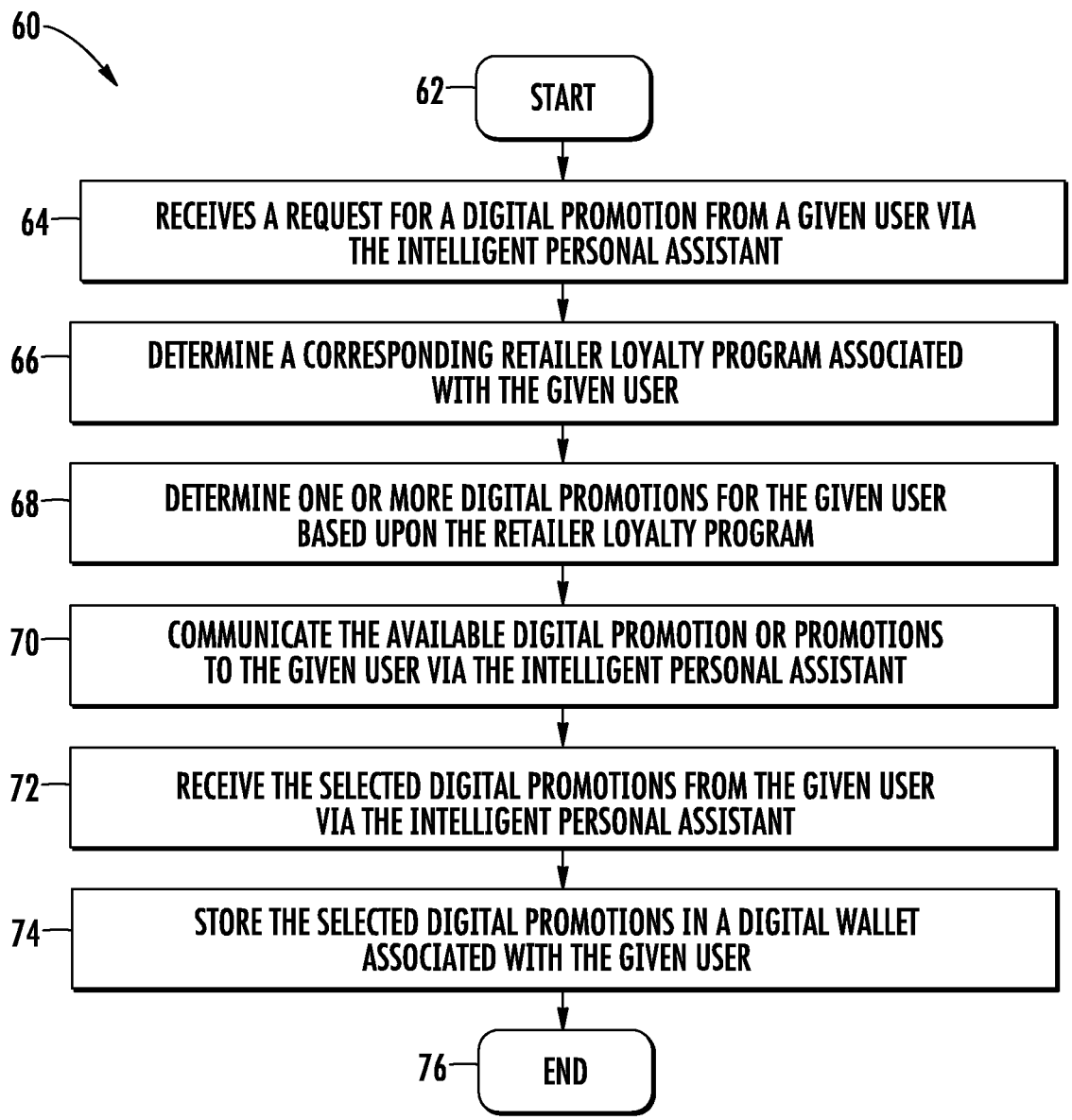
FIG. 3 is a flow diagram of operation of the remote server of the voice-based digital promotion system of FIG. 2.

Referring now additionally to the flowchart 60 in FIG. 3, beginning at Block 62, operation of the voice-based digital promotion system 20 will be described. At Block 64, the remote server 40 receives a request 43 for a digital promotion from a given user 44 via the intelligent personal assistant 30. More particularly, the given user 44 may make the request audibly or through verbal instructions. Through cooperation between the audio input transducer 32 and the controller 34 of the intelligent personal assistant 30, the audible request 43 is received. The intelligent personal assistant 30 communicates the request to the remote server 40. In an exemplary implementation, the given user 44 may request digital promotions 45 by speaking, "Tell me my top offers at ABC Grocery Store" or "Are there any offers available at ABC Grocery Store this week?" In some embodiments, the given user 44 may request a specific product or products and/or brand of product, for example, "Are there are coupons for Soda-A?" or "Are there any coupons for products I've purchased last week?" Of course, the given user 44 may request coupons for any time frame.

At Block 66, the remote server 40 determines a corresponding retailer loyalty program associated with the given user 44. For example, the remote server 40 may determine a corresponding retailer loyalty program based upon a unique user identifier, such as, for example, a telephone number and/or email address. Of course, the unique user identifier may include other and/or additional types of identifiers. The unique user identifier may be used to access the user's account with the retailer loyalty program. The unique user identifier may be communicated from the intelligent personal assistant 30 or another computer by way of an application that provides the "skill" for the intelligent personal assistant.

In some embodiments, the intelligent personal assistant 30 may communicate a device unique identifier to the remote server 40 and match the device unique identifier to the unique user identifier (e.g., telephone number) to access or determine the corresponding retailer loyalty program. The retailer loyalty program includes historical purchase data associated with the given user. For example, the historical purchase data includes information that the given user regularly purchases 12-can packages of "Soda-A", for example, on a weekly basis.

At Block 68, the remote server 40 determines one or more digital promotions 45 for the given user based upon the retailer loyalty program. More particularly, the remote server 40 may determine, based upon the retailer loyalty program, currently available digital promotions 45. The digital promotions 45 may be determined based upon a current weekly or monthly circular of the retailer, historical purchases of the given user 44, and/or available manufacturer digital promotions, for example. Of course, the digital promotions 45 may be determined based upon other and/or additional information from the retailer loyalty program associated with the given user 44. With respect to the implementation example above, the remote server 40 may determine that, based upon the historical purchase data, the given user 44 regularly purchases "Soda-A" and had recently purchased "P's Pasta" and "Willy's Fish Stix" (among other products), and all of these products, have current digital promotions associated therewith.

The remote server 40, at Block 70, communicates the available digital promotion or promotions 45 to the given user via the intelligent personal assistant 30. Upon receipt of the available digital promotions, the intelligent personal assistant 30, through cooperation between the controller 34 and the audio output transducer 33, audibly communicates the available digital promotions to the given user 44. For example, the intelligent personal assistant 30 may verbally speak the product description and associated value of each digital promotion 45. Referring again to the above implementation example, the intelligent personal assistant 30 may audibly communicate that, "There are three digital promotions available: Soda-A, P's Pasta, and Willy's Fish Stix. Would you like to add these to your digital wallet?"

The intelligent personal assistant 30, through cooperation of the audio input transducer 32 and controller 34, audibly receives selected digital promotions 46 by the given user 44. In other words, the given user 44 may audibly or verbally select one or more of the digital promotions 46 for future redemption at the retailer. For example, the selected digital promotions 46 may be stored in a digital wallet associated with the given user 44 and the retailer loyalty program. The intelligent personal assistant 30 communicates the selected digital promotions 46 to the remote server 40. With respect to the implementation example, the given user 44 may speak, "Please save Soda-A and Willy's Fish Stix."

At Block 72, the remote server 40 receives the selected digital promotions from the given user 44 via the intelligent personal assistant 30. At Block 74, the remote server 40 may store the selected digital promotions in a digital wallet associated with the given user 44, for example, for future redemption at a point-of-sale (POS) terminal at the retailer. The process ends at Block 76.

As will be appreciated by those skilled in the art, in contrast to prior approaches whereby physical interaction, such as manual interaction, with a user interface was required to search and select digital promotions, the voice-based digital promotion system 20 may advantageously leverage the lower-friction, hands-free, process of using voice recognition and artificial intelligence. Moreover, the voice-based digital promotion system 20 may more accurately provide relevant digital promotions to a given user and thus increase the likelihood of redemption. Additionally, by permitting the given user to select individual digital promotions from the available digital promotions, a brand, retailer, and/or manufacturer offering the digital promotion may obtain increased exposure and thus increase the value of the digital promotion campaign. In other words, the action of the given user to select digital promotions gives the digital promotion offering entity the benefit that the given user "sees the offer" as opposed to simply automatically selecting all the available digital promotions.

Still further, while digital promotions are described, it will be appreciated that the voice-based digital promotion system 20 may operate with respect to a single digital promotion, and a digital promotion may be either of a digital coupon or digital rebate.

A method aspect is directed to a method of communicating a digital promotion. The method may include using a remote sever 40 to receive a request for a digital promotion from a given user 44 via an intelligent personal assistant 30 and determine a corresponding retailer loyalty program associated with the given user. The method may also include using the remote server 40 to determine at least one digital promotion 45 for the given user 44 based upon the retailer loyalty program and communicate the at least one digital promotion to the given user via the intelligent personal assistant 30.

A computer-readable medium aspect is directed to a non-transitory computer-readable medium for a voice-based digital promotion system 20 that includes an intelligent personal assistant 30 and a remote server 40. The non-transitory computer-readable medium includes computer-executable instructions that when executed by a processor 42 of the remote server 40 cause the processor to perform operations that may include receiving a request for a digital promotion from a given user 44 via the intelligent personal assistant 30 and determining a corresponding retailer loyalty program associated with the given user. The operations may also include determining at least one digital promotion for the given user 44 based upon the retailer loyalty program and communicating the at least one digital promotion to the given user via the intelligent personal assistant 30.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A voice-based digital promotion system comprising:
a remote server configured to store a plurality of available digital promotions; and
a mobile wireless communications device associated with
a given user and comprising
a housing,
an audio input transducer carried by the housing,
an audio output transducer carried by the housing,
wireless communications circuitry carried by the housing, and
a controller coupled to the audio input and audio output transducers and the wireless communications circuitry for operating an intelligent personal assistant to
cooperate with the audio input transducer to audibly receive a request for a digital promotion from the given user, and
cooperate with the wireless communications circuitry to wirelessly communicate the request for the digital promotion and a unique identifier associated with the given user to the remote server;
said remote server configured to
receive the request for the digital promotion from the given user and the unique identifier via the intelligent personal assistant,
determine whether the request for the digital promotion includes a name of a given store at which the digital promotion is redeemable,
determine a corresponding retailer loyalty program associated with the given user based upon the unique identifier, the corresponding retailer loyalty program being associated with the given store when the request for the digital promotion includes the name of the given store,
obtain historical product purchase data for the given user based upon the corresponding retailer loyalty program,
determine whether the request for the digital promotion includes a requested product for purchase,
determine at least one digital promotion from the plurality of available digital promotions corresponding to the requested product for purchase when the request for the digital promotion includes the requested product for purchase, the at least one digital promotion being redeemable at the given store when the request for the digital promotion includes the name of the given store,
determine at least one digital promotion from the plurality of available digital promotions for associated products previously purchased by the given user more than once based upon the historical product purchase data when the request for the digital promotion does not include the requested product for purchase, the at least one digital promotion being redeemable at the given store when the request for the digital promotion includes the name of the given store, and
communicate the at least one digital promotion to the given user via the intelligent personal assistant for audible communication to the given user via the audio output transducer.

2. The voice-based digital promotion system of claim 1 wherein the at least one digital promotion comprises a plurality thereof; and wherein the remote server is configured to receive a selected digital promotion from the plurality thereof from the given user via the intelligent personal assistant.

3. The voice-based digital promotion system of claim 2 wherein the remote server is configured to store the selected digital promotion in a digital wallet associated with the given user.

4. The voice-based digital promotion system of claim 1 wherein the unique user identifier comprises one of a telephone number and an email address.

5. A remote server for a voice-based digital promotion system comprising an intelligent personal assistant, the remote server comprising:
a memory configured to store a plurality of available digital promotions; and
a processor coupled to the memory and configured to
receive a request for a digital promotion from a given user via the intelligent personal assistant, the intelligent personal assistant being operated by a mobile wireless communications device and to audibly receive the request for the digital promotion from a given user via an audio input device of the mobile wireless communications device,
determine whether the request for the digital promotion includes a name of a given store at which the digital promotion is redeemable,
determine a corresponding retailer loyalty program associated with the given user based upon a unique identifier wirelessly communicated from the mobile wireless communications device, the corresponding retailer loyalty program being associated with the given store when the request for the digital promotion includes the name of the given store,
obtain historical product purchase data for the given user based upon the corresponding retailer loyalty program,
determine whether the request for the digital promotion includes a requested product for purchase,
determine at least one digital promotion from the plurality of available digital promotions corresponding to the requested product for purchase when the request for the digital promotion includes the requested product for purchase, the at least one digital promotion being redeemable at the given store when the request for the digital promotion includes the name of the given store, determine at least one digital promotion from the plurality of available digital promotions for associated products previously purchased by the given user more than once based upon the historical product purchase data when the request for the digital promotion does not include the requested product for purchase, the at least one digital promotion being redeemable at the given store when the request for the digital promotion includes the name of the given store, and communicate the at least one digital promotion to the given user via the intelligent personal assistant for audible communication to the given user via an audio output transducer of the mobile wireless communications device.

6. The remote server of claim 5 wherein the at least one digital promotion comprises a plurality thereof; and wherein the processor is configured to receive a selected digital promotion from the plurality thereof from the given user via the intelligent personal assistant.

7. The remote server of claim 6 wherein the processor is configured to store the selected digital promotion in a digital wallet associated with the given user.

8. The remote server of claim 5 wherein the unique user identifier comprises one of a telephone number and an email address.

9. A method of communicating a digital promotion comprising:

using a remote server to receive a request for a digital promotion from a given user via an intelligent personal assistant, the intelligent personal assistant being operated by a mobile wireless communications device and to audibly receive the request for the digital promotion from a given user via an audio input device of the mobile wireless communications device, determine whether the request for the digital promotion includes a name of a given store at which the digital promotion is redeemable, determine a corresponding retailer loyalty program associated with the given user based upon a unique identifier wirelessly communicated from the mobile wireless communications device, the corresponding retailer loyalty program being associated with the given store when the request for the digital promotion includes the name of the given store, obtain historical product purchase data for the given user based upon the corresponding retailer loyalty program, determine whether the request for the digital promotion includes a requested product for purchase, determine at least one digital promotion from a plurality of available digital promotions corresponding to the requested product for purchase when the request for the digital promotion includes the requested product for purchase, the at least one digital promotion being redeemable at the given store when the request for the digital promotion includes the name of the given store, determine at least one digital promotion from the plurality of available digital promotions for associated products previously purchased by the given user more than once based upon the historical product purchase data when the request for the digital promotion does not include the requested product for purchase, the at least one digital promotion being redeemable at the given store when the request for the digital promotion includes the name of the given store, and communicate the at least one digital promotion to the given user via the intelligent personal assistant for audible communication to the given user via an audio output transducer of the mobile wireless communications device.

10. The method of claim 9 wherein the at least one digital promotion comprises a plurality thereof; and wherein using the remote server comprises using the remote server to receive a selected digital promotion from the plurality thereof from the given user via the intelligent personal assistant.

11. The method of claim 10 wherein using the remote server comprises using the remote server to store the selected digital promotion in a digital wallet associated with the given user.

12. A non-transitory computer-readable medium for a voice-based digital promotion system comprising an intelligent personal assistant and a remote server, the non-transitory computer-readable medium comprising computer-executable instructions that when executed by a processor of the remote server cause the processor to perform operations comprising:

receiving a request for a digital promotion from a given user via the intelligent personal assistant, the intelligent personal assistant being operated by a mobile wireless communications device and to audibly receive the request for the digital promotion from a given user via an audio input device of the mobile wireless communications device;

determining whether the request for the digital promotion includes a name of a given store at which the digital promotion is redeemable;

determining a corresponding retailer loyalty program associated with the given user based upon a unique identifier wirelessly communicated from the mobile wireless communications device, the corresponding retailer loyalty program being associated with the given store when the request for the digital promotion includes the name of the given store;

obtaining historical product purchase data for the given user based upon the corresponding retailer loyalty program;

determining whether the request for the digital promotion includes a requested product for purchase;

determining at least one digital promotion from a plurality of available digital promotions corresponding to the requested product for purchase when the request for the digital promotion includes the requested product for purchase, the at least one digital promotion being redeemable at the given store when the request for the digital promotion includes the name of the given store;

determining at least one digital promotion from the plurality of available digital promotions previously purchased by the given user more than once based upon the historical product purchase data when the request for the digital promotion does not include the requested product for purchase, the at least one digital promotion being redeemable at the given store when the request for the digital promotion includes the name of the given store; and communicating the at least one digital promotion to the given user via the intelligent personal assistant for audible communication to the given user via an audio output transducer of the mobile wireless communications device.

13. The non-transitory computer-readable medium of claim 12 wherein the at least one digital promotion comprises a plurality thereof; and wherein the operations comprise receiving a selected digital promotion from the plurality thereof from the given user via the intelligent personal assistant.

14. The non-transitory computer-readable medium of claim 13 wherein the operations comprise storing the selected digital promotion in a digital wallet associated with the given user.

15. The non-transitory computer-readable medium of claim 12 wherein the retailer loyalty program comprises historical purchase data associated with the given user; and wherein the operations comprise determining the at least one digital promotion for the given user based upon the historical purchase data.

* * * * *